United States Patent [19]

Bonniau et al.

[11] Patent Number: 4,663,690
[45] Date of Patent: May 5, 1987

[54] RESIDUAL DIFFERENTIAL DEVICE EQUIPPED WITH A SURVEILLANCE SYSTEM FOR THE ELECTRONIC POWER SUPPLY

[75] Inventors: Michel Bonniau, Lux; Marc Paupert, Chalon, both of France

[73] Assignee: Merlin Gerin, Grenoble, France

[21] Appl. No.: 661,910

[22] Filed: Oct. 17, 1984

[30] Foreign Application Priority Data

Oct. 24, 1983 [FR] France ............................. 83 17037

[51] Int. Cl.$^4$ ............................................. H02H 3/26
[52] U.S. Cl. ........................................ 361/44; 361/46
[58] Field of Search ...................... 361/44, 45, 46, 92

[56] References Cited

U.S. PATENT DOCUMENTS

| | | |
|---|---|---|
| 3,001,100 | 9/1961 | Schuh et al. |
| 3,585,452 | 6/1971 | Goodwin ............... 361/44 |
| 3,786,311 | 1/1974 | Hobson, Jr. et al. .......... 361/44 |
| 3,999,087 | 12/1976 | Compton ............. 361/92 X |
| 4,068,276 | 1/1978 | Pintell . |
| 4,507,713 | 3/1985 | Hsieh ..................... 361/92 |
| 4,513,339 | 4/1985 | Ishigami et al. ............. 361/45 |
| 4,530,027 | 7/1985 | Berger ..................... 361/92 |
| 4,542,433 | 9/1985 | Schaefer et al. ............ 361/92 |
| 4,574,324 | 3/1986 | Packard ................. 361/45 X |

FOREIGN PATENT DOCUMENTS

| | | |
|---|---|---|
| 2653453 | 6/1978 | Fed. Rep. of Germany . |
| 2445050 | 7/1980 | France . |
| 0082462 | 7/1981 | Japan .......................... 361/44 |
| 0538452 | 2/1977 | U.S.S.R. .................. 361/44 |
| 1061213 | 12/1983 | U.S.S.R. .................. 361/44 |

OTHER PUBLICATIONS

"One-Shot Serving as Missing Pulse Detector Spots Loss of AC Line Voltage Quickly"-Kraengel, *Electronic Design*, 5/79.

*Primary Examiner*—A. D. Pellinen
*Assistant Examiner*—A. Jonathan Wysocki
*Attorney, Agent, or Firm*—Parkhurst & Oliff

[57] ABSTRACT

The electronics of a residual differential device is powered by several sources derived from the electrical system (14, 16, 18). A supply anomaly detector (36) signals the failure of one of the supply sources caused, for example, by a break in one of the wires (14, 16, 18). The anomaly detector signals the break in this wire and sends a tripping order to the protection circuit breaker (10). Voltage in the phase conductors is monitored, and an alarm device is energized, for example, if one of the phase conductors is open.

9 Claims, 4 Drawing Figures

RESIDUAL DIFFERENTIAL DEVICE EQUIPPED WITH A SURVEILLANCE SYSTEM FOR THE ELECTRONIC POWER SUPPLY

BACKGROUND OF THE INVENTION

The invention refers to a residual differential device for a multipolar current breaking appliance which has a power supply derived from the system voltage by a diode bridge rectifier circuit connected to more than two polyphase supply wires.

The electronics of residual differential devices requires a certain energy to function and one distinguishes between the so-called "own current" or detected-current supplied differential devices in which the energy is borrowed from the fault current itself, and the auxiliary source devices in which the energy is supplied by an independent source or by the controlled electrial system. The own current differential devices ensure complete security, the supply being automatically available in the event of a fault. Two types of auxiliary source devices are known. With the first type the security of the device is ensured by an automatic tripping system in the event of a lack of voltage from the source. These known devices, not being able to start again on their own in the event of the auxiliary source reappearing, have the disadvantage of not ensuring a continuity of operation, which is often unacceptable particularly for appliances assembled as switchboards. With the second type, the security is only obtained if the electrical continuity of all the auxiliary source wires is ensured. Effectively, if a single phase circuit is considered, in the event of a break in the neutral wire, the supply from the auxiliary source and at the same time the operating security are no longer ensured while the risk of a fault in the phase wire continues. To alleviate this disadvantage, it has previously been proposed to double or multiply the supply sources and, particularly in the device of the type mentioned above in which the energy is supplied by the controlled electrical system, to provide several supply wires, particularly phasse and neutral ones and if necessary earth. The risks of failure are thereby considerably reduced, but a dangerous situation may result if one or several of the sources are faulty and the appliance functions with a single supply source which could itself fail.

The present invention has as its aim the remedying of this disadvantage and the possibility of production of a totally safe residual differential device.

SUMMARY OF THE INVENTION

The residual differential device according to the invention is characterised in that it comprises a device for the surveillance of the source by wire voltage detectors, these being connected to a signalling or tripping control circuit acting in the event of a break in one of the wires.

The failure or break in one of the supply wires is signalled immediately, the breaking appliance being able either to trip immediately, or to remain in temporary operation.

According to a development of the invention, the breaking appliance remains in operation as long as there are two distinct supply sources, the trip intervening in the event of failure of one or other of them which avoids any dangerous situation and all risks of non-tripping due to lack of supply to the differential device electronics.

The supply is applicable to a bipolar appliance in which case phase, neutral and earth wires are required to ensure the double supply of the electronics respectively by the phase-neutral and phase-earth circuits. The invention is especially applicable to tri- or tetrapolar appliances using several phase wires along with the neutral wire for the supply of the electronics. In the bipolar case, the tripping of the break appliance is ensured as soon as one of the sources is faulty, this tripping intervening instantly or with a very slight delay enabling the operator to intervene if necessary. In the tri- or tetrapolar cases, the tripping of the appliance can be ensured as soon as the failure of one of the supply sources occurs, or preferably when only one of the supply sources is still intact.

According to another aspect of the invention, a break in a phase wire is detected by the absence of voltage in the wire, whereas a break in the neutral wire is signalled by an increase in voltage in this wire. The failures are signalled to advantage by luminescent diodes indicating the faulty wire.

Other advantages and characteristics of the invention will be made clear in the following description of the different methods of operation given as non-limiting examples and represented by the drawings in which:

DETAILED DESCRIPTION OF THE PREFERRED EMBODIMENTS

Figure 1:
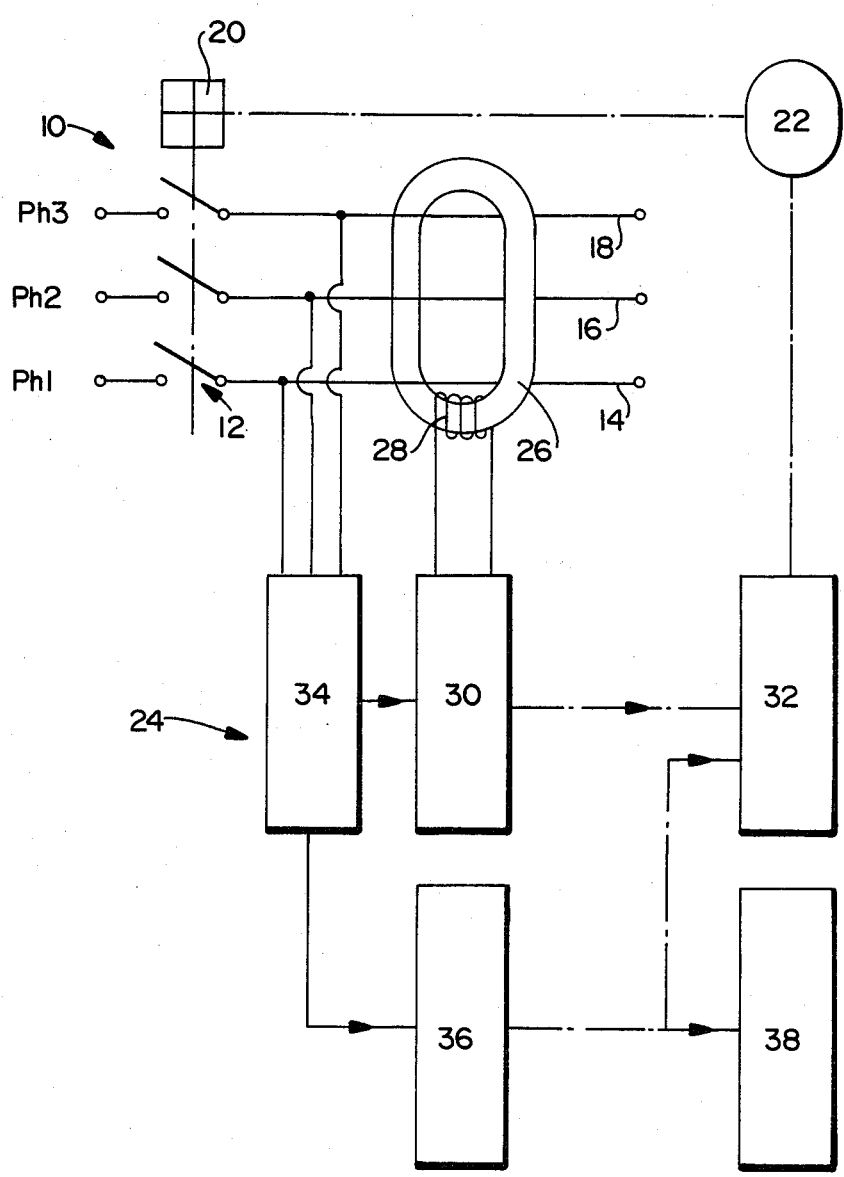
FIG. 1 is the synoptic diagram of a differential tripping device associated with a current breaking appliance.

In the drawing figures, a tripolar circuit breaker (10) comprises the breaking contacts (12) of three phase wires (14, 16, 18). The contacts (12) are controlled by a lock (20) piloted by a tripping relay (22). The circuit breaker (10) is associated with a residual differential device represented by the general reference (24) and comprising a toroidal sensor (26) surrounding the three wires (14, 16, 18) and a secondary winding (28) connected to a comparator block (30). The comparator block (30) sends a signal to the tripping system (32) when the signal from the secondary winding (28), representing a residual differential current, goes beyond a predetermined threshold level. The tripping system (32) then operates the relay (22) causing the opening of the contacts (12) and the break in the current. The electronics of the residual differential device (24) are supplied by a supply block (34) connected to the three phase wires (14, 16, 18). Such differential devices are well-known in the art and it is unnecessary to describe them in more detail.

According to the present invention, the residual differential device (24) comprises a supply anomaly detector (36) which issues an anomaly signal in the event of failure of one of the supply sources (34), particularly when there is a break on one of the phase wires (14, 16, 18). The signal issued by the supply anomaly detector (36) is transmitted on the one hand to a visual display module block (38), and on the other hand to the tripping system to both signal the anomaly and cause the tripping of the circuit breaker (10).

Figure 2:
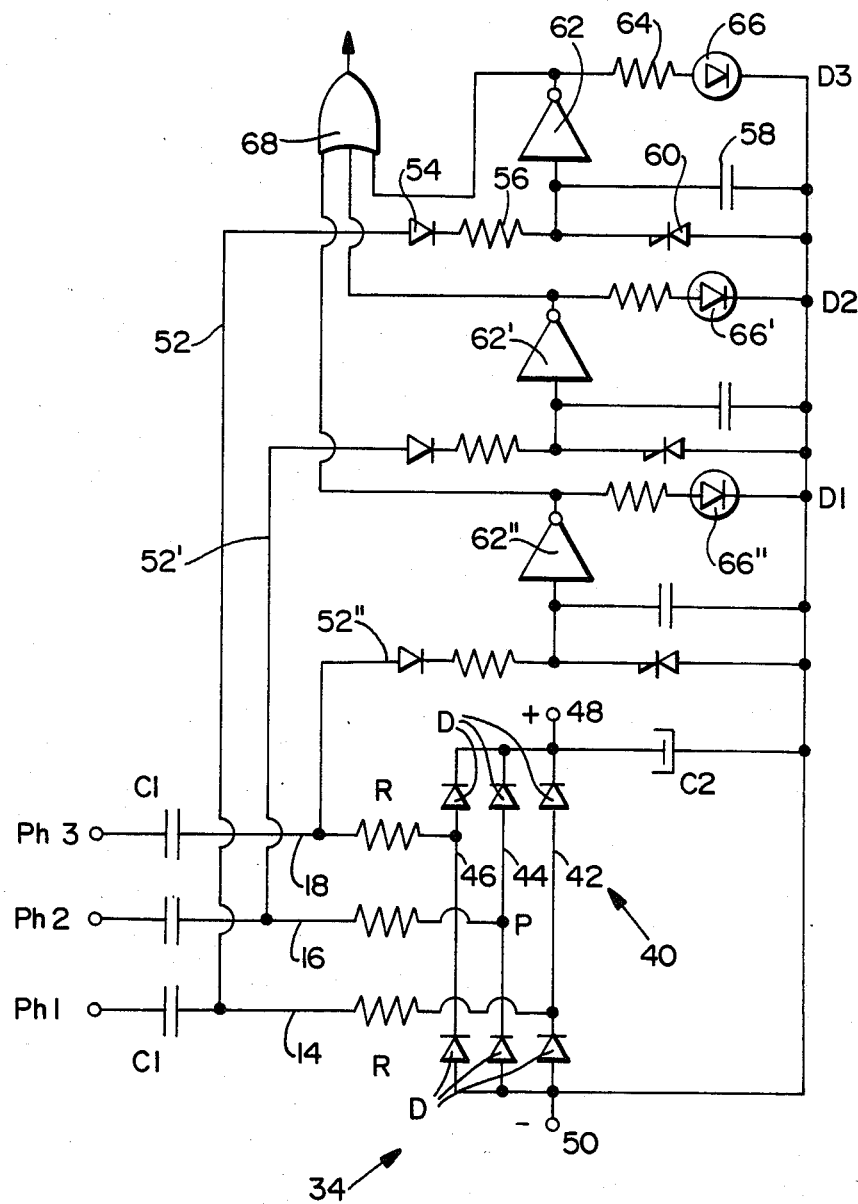
FIG. 2 is the electrical diagram of the anomaly detector blocks and anomaly visualisation according to FIG. 1.

With particular reference to FIG. 2, which represents the supply blocks (34), anomaly detector (36) and visual display module (38) it can be seen that the supply block (34) comprises the diode bridge (40) with three branches (42, 44, 46) each comprising two diodes (D) leading alternately and whose connecting point is connected respectively to the phase wires (14, 16, 18) by way of a resistor (R) and a capacitance (C1). The supply current for the electronics is sampled at the end terminals (48, 50) of the bridge (40), a filtering capacitance (C2) connecting the terminals (48, 50). The wire (14) from phase 1 is connected to a voltage detection circuit (52) made up of a diode (54), a resistor (56) and a capacitance (58) shunted by a Zener diode (60), all electrically connected in series. The entry of an inverter (62) is connected to the resistor (56) and capacitance (58) junction point, whereas the end of the inverter (62) is connected by way of a resistor (64) to a luminescent diode or LED (66) and also to one of the inputs of an OR gate (68). In an identical manner the phase wires (16, 18) are each connected to an anomaly detector circuit (52', 52") whose inverters (62', 62") are connected on the one hand to electro-luminescent diodes (66', 66") and on the other hand to two other inputs of gate (68).

The residual differential device according to FIGS. 1 and 2 functions in the following manner:

When the three phase wires (14, 16, 18) have current flowing in them whose vectorial sum is zero, the secondary winding (28) delivers a signal of value zero and the circuit breaker (10) remains closed. The supply of the electronics is derived from the three wires (14, 16, 18) by the diode bridge (40). The alternating voltage present in wire (14) is transmitted by the circuit (52) to the input of the inverter (62) after rectifying by the diode (54). The presence of a voltage signal at the input of the inverter (62) is given by a zero signal at the output transmitted to gate (68). The electro-luminescent diode (66) is not excited. In an identical manner the presence of voltage in the phase wires (16, 18) is given by zero signals to the inputs of gate (68) and by the extinction of the electro-luminescent diodes (66', 66"). The appliance is ready to operate and on appearance of a differential fault, the circuit breaker (10) trips in the usual manner.

When there is a break in one of the phase wires, for example the wire (14), the bridge (40) remains supplied by the two other phase wires (16, 18) who supply the power for the electronics. The residual differential device supplied in a normal manner is ready to function in the event of appearance of a residual differential fault of the above-mentioned type. The disappearance of the voltage in the broken phase wire (14) causes a zero signal to appear at the input to the inverter (62) which gives a signal of level 1 at the exit applied to the input of gate (68) and to the electro-luminescent diode (66). This diode (66) illuminates to signal the absence of voltage in wire (14), whereas the gate (68) transmits to the tripping system (32) a tripping signal causing the opening of the circuit breaker (10). The tripping can be deferred as the appliance remains supplied in the normal manner and fully ensures the differential protection. The security is however no longer absolute in the sense that a failure or break in one of the other two wires (16, 18) would cause the only available supply source to disappear thus preventing functioning of the residual differential device. The luminescent diode (66) indicates a break in the phase wire (14) and in the event of tripping defers the precarious situation of the appliance. The circuits (52', 52") indicate in an identical manner a lack of voltage and therefore a break in the wires (16, 18). Any failure in the supply to the electronics being avoided, the differential device ensures absolute safety. In the event of simultaneous break in all three supply wires, the risk of failure no longer exists. The device does not therefore induce the tripping of the appliance, and the continuity of operation is therefore automatically ensured on reappearance of the supply.

The diagram according to FIG. 2 is a diagram of principle which may be produced in a different manner and the specialist will understand the functions of the elements not described in detail, particularly of the pulsed voltage signal damping capacitor (58) applied at the entry to the inverter (62) and the Zener diode (60) for protection against overload.

Figure 3:
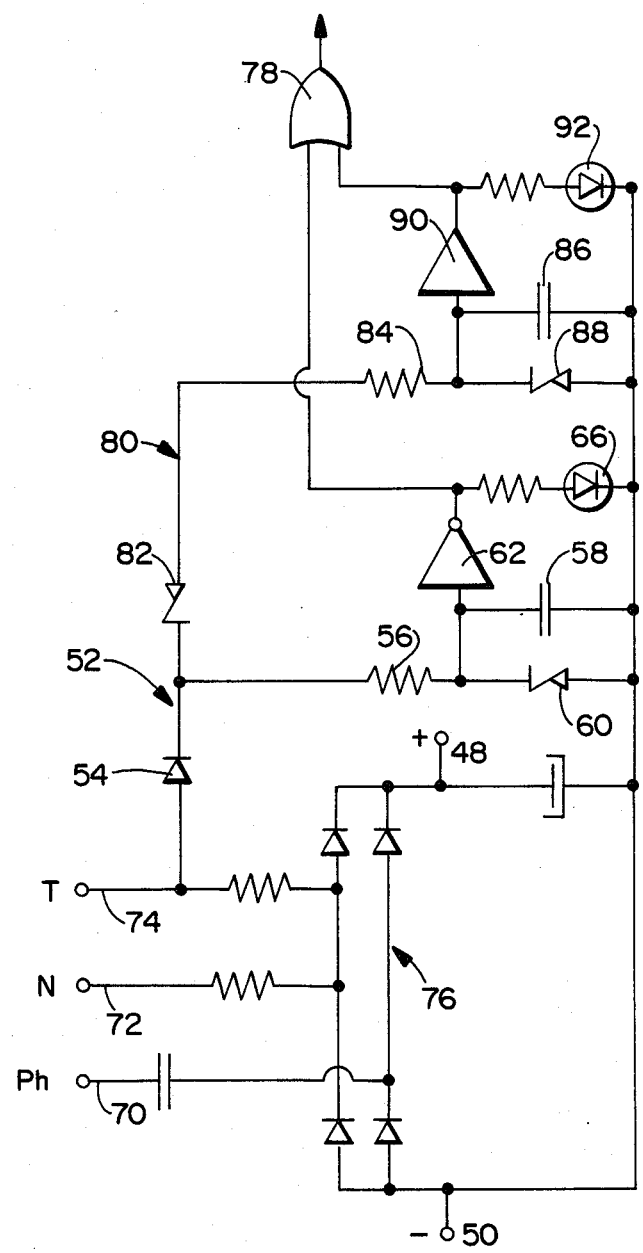
FIGS. 3 and 4 are the electrical diagrams analogous to that of FIG. 2 of bipolar and tetrapolar supplies.
Figure 4:
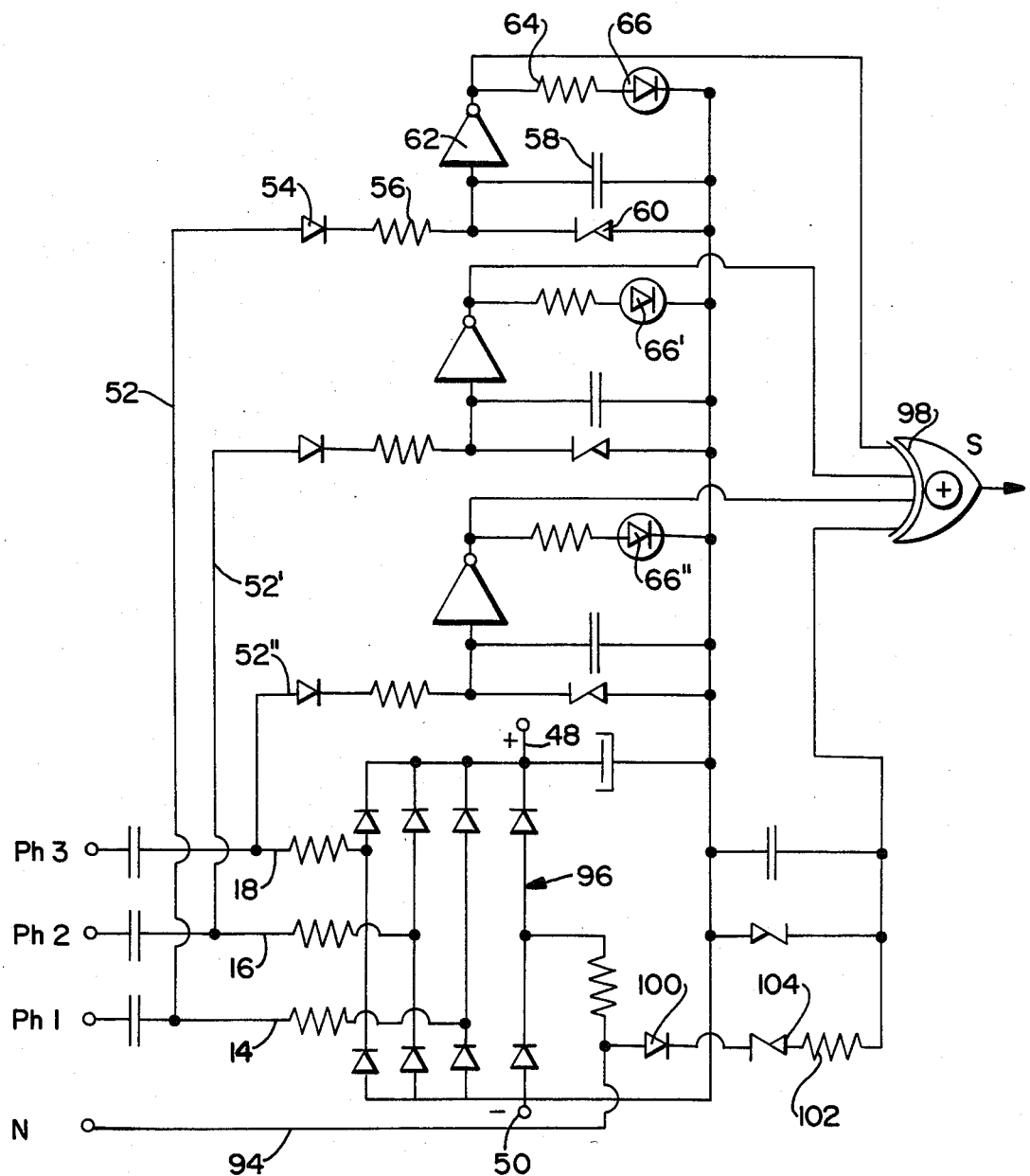

FIGS. 3 and 4 illustrate two other methods of application of the residual differential device according to the invention, the same reference numbers being used to designate the elements identical or analogous to those of FIG. 2. FIG. 3 represents a bipolar appliance with the phase wire (70), the neutral wire (72) and the earth wire (74) connected to a two branched diode bridge (76), the neutral (72) and earth (74) wires being connected to the same branch by way of resistors to provide the supply to the electronics from the terminals (48, 50) at the exit of the bridge (76). The earth wire (76) is connected to a detection circuit (52) comprising diode (54), resistor (56) and capacitor (58) in series shunted by the Zener diode (60). An inverter (62) is connected to the resistor (56) and capacitor (58) junction point and its output is connected to the luminescent diode (66) and to one of the inputs of an OR gate (78). At the cathode of the diode (54) a detection circuit (80) is connected comprising a Zener diode (82), a resistor (84) and a capacitance (86) in series shunted by a Zener diode (88). The input of an amplifier (90) is connected to the resistor (84) and capacitance (86) junction point, whereas the output of the amplifier (90) is connected on the one hand to the second input of the OR gate (78), and on the other hand to an electro-luminescent diode (92). The output of the OR gate (78) is connected to the tripping system (32).

The appliance represented by FIG. 3 functions in the following manner:

The diode bridge (76) is normally supplied by the phase (70) and neutral (72) wires. The difference in voltage present between the earth wire (74) and the negative output (50) of the bridge (76) causes a voltage signal to appear at the input to the inverter (62) which gives a zero signal at its output, the electro-luminescent diode (66) remaining lit. This difference in voltage is lower than the threshold level for the Zener diode (82) and the electro-luminescent diode (92) is also lit.

A break in the phase wire (70) interrupts the supply to the electronics of the residual differential device which is therefore unable to function. This situation is not dangerous as none of the wires is live.

A break in the earth wire (74) does not affect the supply to the diode bridge (76) which remains supplied in the normal way by the phase (70) and neutral (72) wires. The break in the earth wire (74) causes, as described above, the illumination of the electro-luminescent diode (66) and the issuing of a tripping signal by gate (78).

A break in the neutral wire (72) does not affect the supply to the diode bridge (76) connected to the healthy phase (70) and earth (74) wires. This break in wire (72) is accompanied by a derivation of the current by the earth wire (74), an increase in voltage which goes beyond the threshold level for the Zener diode (82) and the application of a signal at the electro-luminescent diode (92) and at the OR gate (78), which leads to the tripping of the appliance. It is also possible to defer the tripping to enable the operator to intervene when a fault is signalled by illumination of one of the electro-luminescent diodes (66, 92).

FIG. 4 shows the diagram of a tetrapolar appliance with three phase wires (14, 16, 18) and a neutral wire (94). The four wires (14, 16, 18, 94) are connected in the above-mentioned manner, each to one of the branches of the four branched diode bridge (96) to produce the supply voltage in the terminals (48, 50) at the exit of the bridge (96). The three phase wires (14, 16, 18) are each connected to a voltage detection circuit (52, 52', 52") described in detail above refering to FIG. 2. The signals from the circuits (52, 52', 52") are applied to the electro-luminescent diodes (66, 66', 66") and to an exclusive OR gate (98) with four inputs. The earth wire (94) is connected by a diode (100), a Zener diode (104) and a resistor (102) in series to the fourth input of the exclusive OR gate. The output of the exclusive OR gate (98) is connected to the tripping system (32). For normal functioning the three phase wires (14, 16, 18) are live and no signal is applied to gate (98) or to the electro-luminescent diodes (66, 66', 66"). The absence of voltage in the neutral wire (94) gives a zero signal applied to the fourth input of the OR gate (98). The signals applied to the four inputs of gate (98) all being zero, no signal is transmitted to the tripping device. It is useful to note that gate (98) of exclusive OR type issues a signal if the number of one signals applied to these entries is odd. A break in the neutral wire does not affect the supply to the diode bridge (96) which is ensured by the three phase wires (14, 16, 18). This break does not notably modify the potential of the anode of diode (100), the gate (98) therefore does not deliver a tripping signal as all its inputs are at zero.

An additional break in one the phase wires, for example the wire (14) of phase 1, causes, according to the process already described, the illumination of the electro-luminescent diode (66) and applies an initial signal one to the gate (98). This latter then gives the order to trip with a delay if necessary.

In the event of only one phase wire being broken, for example the wire (14) of phase 1 as in the previous case, the diode (66) is lit and a signal one is applied to the gate (98). However, an increase in the potential of the neutral wire is simultaneously observed which causes the application of a second signal one to the gate (98). In this case, the number of one signals on the entries to gate (98) being even, no tripping order is given.

An additional break of a second phase wire would lead to the application of a third one on the inputs to gate (98) which would cause the tripping with or without delay. In this case, the supply would no longer be ensured by only the third phase and the neutral. Without detecting or signalling the only break in the neutral wire, this device therefore enables continuity of operation to be ensured, as in the previous cases, until the admissible limit which corresponds to the availability of a single supply.

In the case of a quadripolar appliance, the earth wire is unused, the protection being already in excess. It is however clear that nothing opposes its use.

We claim:

1. A ground fault protection device used in a polyphase power circuit comprising three phase conductors and a neutral conductor, a power source, a load, and a power circuit breaker having contacts disposed in series with said phase conductors, said device comprising, in combination:
    current sensor means, having a toroidal core surrounding said conductors, and having a secondary winding on said core, for generating a ground fault signal indicative of a ground fault in said power circuit downstream of said core;
    a power supply circuit coupled to said phase conductors and including a diode rectifying bridge network having respective inputs coupled to said phase conductors;
    signal processor means, powered from said power supply circuit and coupled to said secondary winding of said toroidal core, for producing a first trip signal upon occurrence of said ground fault signal;
    voltage sensor means coupled to said phase conductors for sensing respective voltage levels on respective phase conductors;
    control circuit means, connected to said voltage sensor means, for producing an alarm signal when a voltage level of at least one of said phase conductors varies from a respective predetermined level, and for producing a second trip signal when voltage levels of only two of said phase conductors vary from respective predetermined levels; and
    trip solenoid means, operatively coupled to said power circuit breaker, and controlled by said signal processor means and said control circuit means, for tripping said circuit breaker upon occurrence of said first or said second trip signal.

2. A ground fault protection device as recited in claim 1 wherein said voltage sensor means includes respective capacitors connected to each phase conductor, a diode connected in series with each capacitor, and an inverter having an input connected to a junction of each capacitor and respective diode, each said inverter producing a logic signal when said respective phase conductor is not at said predetermined level; and
    wherein said control circuit means includes an OR circuit having inputs connected to said logic signal produced by each said inverter.

3. The ground fault protection device as recited in claim 2 wherein said OR circuit is an exclusive OR gate.

4. A ground fault protection device as recited in claim 3 wherein said voltage sensor means further includes logic circuit means connected to said neutral conductor for producing a logic signal when a voltage on said neutral conductor is non-zero, said logic signal being applied to an input of said exclusive OR gate, said exclusive OR gate having an output providing said second trip signal.

5. A ground fault protection device used in a polyphase power circuit comprising three phase conductors, a ground conductor and a neutral conductor, a power source, a load, and a power circuit breaker having contacts in series with said phase conductors; said device comprising, in combination:
    current sensor means, having a toroidal core surrounding said conductors and said neutral conductor of said power circuit, and having a secondary winding on said core, for generating a ground fault signal indicative of a ground fault in said power circuit downstream of said core;

a power supply circuit coupled to said phase conductors and including a diode rectifying bridge network having respective inputs coupled to said phase conductors;

signal processing means, powered from said power supply circuit and coupled to said secondary winding of said toroidal core, for producing a first trip signal upon occurrence of said ground fault signal;

voltage sensor means coupled to said phase conductors and to said neutral conductor for sensing respective voltages levels thereon;

control circuit means, connected to said voltage sensor means, for producing an alarm signal when a voltage level of at least one of said phase conductors varies from a respective predetermined level, and for producing a second trip signal when a voltage level of only two of said phase conductors vary from a respective predetermined level; and trip solenoid means, operatively coupled to said power circuit breaker and controlled by said signal processor means and said control circuit means, for tripping said circuit breaker upon occurrence of said first or second trip signal.

6. A ground fault protection device used in a polyphase power circuit comprising three phase conductors and a ground conductor, a power source, a load, and a power circuit breaker having contacts in series with said phase conductors; said device comprising, in combination:

current sensor means having a toroidal core surrounding said conductors, and having a secondary winding on said core for generating a ground fault signal indicative of a ground fault in said power circuit downstream of said core;

a power supply circuit coupled to said phase conductors and including a diode rectifying bridge network having respective inputs coupled to said phase conductors;

signal processor means, powered from said power supply circuit, and coupled to said secondary winding of said toroidal core, for producing a first trip signal upon occurrence of said ground fault signal;

voltage sensor means coupled to said phase conductors for sensing respective voltage levels on respective phase conductors;

control circuit means, connected to said voltage sensor means, for producing an alarm signal when a voltage level of at least one of said phase conductors varies from a respective voltage level, and for producing a second trip signal when voltage levels of only two of said phase conductors vary from respective predetermined levels; and trip solenoid means, operatively coupled to said power circuit breaker and controlled by said signal processor means and said control circuit means, for tripping said circuit breaker upon occurrence of said first or second trip signal.

7. The ground fault protection device of claim 6 wherein said voltage sensor means includes respective capacitors connected to each phase conductor, a diode connected in series with each capacitor, and an inverter having an input connected to a junction between each capacitor and respective diode, each said inverter producing a logic signal when said respective phase conductor is not at said respective predetermined level; and wherein said control circuit means includes an OR circuit having inputs connected to respective logic signals.

8. The ground fault protection device as recited in claim 7 wherein said OR circuit is an exclusive OR gate.

9. The ground fault protection device as recited in claim 8 wherein said voltage sensor means further includes logic circuit means connected to said ground conductor for producing a logic signal when a voltage on said ground conductor is non-zero, said logic signal being applied to one of said inputs of said exclusive OR gate;

said exclusive OR gate having an output providing said second trip signal.

* * * * *